(12) United States Patent
Connors et al.

(10) Patent No.: US 8,364,553 B2
(45) Date of Patent: Jan. 29, 2013

(54) MANAGING FRESH-PRODUCT INVENTORY

(75) Inventors: Daniel P. Connors, Pleasant Valley, NY (US); Markus Ettl, Yorktown Heights, NY (US); David D. Yao, Yorktown Heights, NY (US); Zhengliang Xue, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/093,359

(22) Filed: Apr. 25, 2011

(65) Prior Publication Data

US 2012/0271740 A1    Oct. 25, 2012

(51) Int. Cl.
*G06Q 30/00*   (2006.01)
(52) U.S. Cl. .......................... 705/26.2; 705/28
(58) Field of Classification Search ................ 705/26.2, 705/34, 35; 235/379, 380
See application file for complete search history.

(56) References Cited

U.S. PATENT DOCUMENTS

| | | | | |
|---|---|---|---|---|
| 5,953,707 | A * | 9/1999 | Huang et al. ............. | 705/7.25 |
| 6,397,226 | B1 | 5/2002 | Sage | |
| 7,801,778 | B2 | 9/2010 | Fox | |
| 2002/0072988 | A1 * | 6/2002 | Aram .................... | 705/26 |
| 2002/0143669 | A1 * | 10/2002 | Scheer .................. | 705/28 |
| 2006/0069598 | A1 * | 3/2006 | Schweitzer et al. ......... | 705/8 |

OTHER PUBLICATIONS

John T Blake, Michael W Carter, A goal programming approach to strategic resource allocation in acute care hospitals, European Journal of Operational Research. Amsterdam: Aug. 1, 2002. vol. 140, Iss. 3; p. 541 (Attached).*
Brodheim, E.C., C. Derman and G.P. Prastacos. 1975. On the evaluation of a class of inventory policies for perishable products such as whole blood. Mgmt. Sci. 21, 1320-1325.
Cai, X., J. Chen, Y. Xiao, X. Xu. 2009. Optimization and coordination of fresh product supply chains with freshness-keeping effort. Prod. Oper. Mgmt. 19, 261-278.
Cohen, M.A. 1976. Analysis of single critical number ordering policies for perishable inventories. Oper. Res. 24, 726-741.
Cooper, W. L. 2001. Pathwise properties and performance bounds for a perishable inventory system. 2001. Oper. Res. 49(3) 455-466.
Fries, S. 1975. Optimal order policies for a perishable commodity with fixed lifetime. 1975. Oper. Res. 23, 46-61.
Liu, L., Z. Lian. 1999. (s,S) continuous review models for products with fixed lifetimes. 1999. Oper. Res. 47, 150-158.
Nahmias, S. 1975. Optimal ordering policies for perishable inventory-II. Oper. Res. 23, 735-749.
Weiss, H.J. 1980. Optimal ordering policies for continuous review perishable inventory models. Oper. Res. 28, 365-374.

* cited by examiner

*Primary Examiner* — Scott Zare
*Assistant Examiner* — Rokib Masud
(74) *Attorney, Agent, or Firm* — Scully, Scott, Murphy & Presser, P.C.; Daniel P. Morris, Esq.

(57) ABSTRACT

Freshness inventory control problem may be formulated as a stochastic dynamic program. In one aspect, a stochastic dynamic programming formulation takes as input inventory status, stochastic demand forecast and cost information associated with on-hand inventory. The stochastic dynamic programming formulation is maximized to determine order quantity and depletion quantity of the product per period.

20 Claims, 6 Drawing Sheets

Observe on-hand inventory at the beginning of period t

| Product ID | Family | Calendar Date | OH1 | OH2 | OH3 |
|---|---|---|---|---|---|
| UX8977 | Bakery | Period t | 13 | 3 | 5 |

402

Make inventory decision in period t: Depletion quantity = 3 & Ordering quantity = 4

| Product ID | Family | Calendar Date | OH1 | OH2 | OH3 | OH4 |
|---|---|---|---|---|---|---|
| UX8977 | Bakery | Period t | 10 | 3 | 5 | 4 |

404

Satisfy demand = 11 in period t, and then observe on-hand inventory at the beginning of period t + 1

| Product ID | Family | Calendar Date | OH1 | OH2 | OH3 |
|---|---|---|---|---|---|
| UX8977 | Bakery | Period t + 1 | 2 | 5 | 4 |

MANAGING FRESH-PRODUCT INVENTORY

FIELD

The present application relates generally to supply chain network and systems, and more particularly to managing fresh product inventory.

BACKGROUND

Freshness inventory refers to a stocking system of products with a relatively short shelf life such that managing some measure of freshness is a central concern. Freshness inventory differs from perishable inventory in several ways. Perishable inventory has a binary (0-1) utility: zero utility after the expiration date and full utility before. The utility of freshness inventory, in contrast, dynamically decreases to zero over time. Control of perishable inventory involves the usual tracking of on-hand inventory, in terms of quantities, along with the replenishment decisions: when to order and how much to order. A popular replenishment policy is the single critical-number policy—comparing the total on-hand inventory with the base-stock level, which is the critical number, and order up to the latter.

The existing research on perishable inventory mostly focuses on stationary models, where products have either fixed or random shelf-life. For a single product with a fixed lifetime under periodic review, the optimal policy is identified in Fries (Fries, S. 1975. *Optimal order policies for a perishable commodity with fixed lifetime.* 1975. Oper. Res. 23, 46-61) and Nahmias (Nahmias, S. 1975. *Optimal ordering policies for perishable inventory-II.* Oper. Res. 23, 735-749), via dynamic programming, in terms of the order quantities as a function of the age distribution of the on-hand inventory. The optimal order quantities, being solutions to functional equations, are usually difficult to evaluate. Approximations are proposed, which often take the form of a "critical number" (i.e., order-up-to) policy, where the critical number is either optimized or approximated (Cohen, M. A. 1976. *Analysis of single critical number ordering policies for perishable inventories.* Oper. Res. 24, 726-741; Nahmias), or a policy with a fixed order quantity (Brodheim, E. C., C. Derman and G. P. Prastacos. 1975. *On the evaluation of a class of inventory policies for perishable products such as whole blood.* Mgmt. Sci. 21, 1320-1325). Cooper (Cooper, W. L. 2001. *Pathwise properties and performance bounds for a perishable inventory system.* 2001. Oper. Res. 49(3) 455-466.) considers the critical-number policy and derive bounds on the stationary distribution of the number of perished/discarded units ("outdates") by the end of each period. The bounds are useful to identify the right critical number to use while meeting a required level of quality-of-service.

Under Poisson demand, zero lead time and fixed product lifetime, Weiss (Weiss, H. J. 1980. *Optimal ordering policies for continuous review perishable inventory models.* Oper. Res. 28, 365-374) shows that under continuous review, the optimal policy is (S, s), with s=0 in the lost sales case. Liu and Lian (Liu, L., Z. Lian. 1999. *(s,S) continuous review models for products with fixed lifetimes.* 1999. Oper. Res. 47, 150-158) consider the same (S, s) policy, under renewal demand, and derive closed-form results for the steady-state inventory distribution in the case of backordering. In a recent study, Cai et al. (Cai, X., J. Chen, Y. Xiao, X. Xu. 2009. *Optimization and coordination of fresh product supply chains with freshness-keeping effort.* Prod. Oper. Mgmt. 19, 261-278), a freshness index and a surviving index are developed to measure the quality and the quantity of the stock available to supply the demand; and decisions are made via a single-period newsvendor-like model, on the order quantity, selling price, and the level of freshness-keeping effort involved in shipping the product to the market.

BRIEF SUMMARY

A method for managing inventory freshness, in one aspect, may include receiving inventory status associated with a product having freshness shelf-life. The inventory status in one aspect may include inventory of the product classified into age classification. The method may also include receiving stochastic demand forecast associated with the product. In one aspect, the stochastic demand forecast may include sales forecast and associated variance for each of the age classification of the product. The method may further include receiving cost information associated with the product. The cost information, in one aspect, may include a wholesale cost, a retail sale price, a salvage price and a holding cost associated with the product. The method may also include maximizing a stochastic dynamic programming formulation that takes as input the inventory status, the stochastic demand forecast and the cost information. The method may further include determining order quantity and depletion quantity of the product per period based on the maximizing of the stochastic dynamic programming formulation.

A system for managing inventory freshness, in one aspect, may include a stochastic dynamic programming formulation, and module operable to receive inventory status associated with a product having freshness shelf-life, the inventory status including inventory of the product classified into age classification. The module may be further operable to receive stochastic demand forecast associated with the product, the stochastic demand forecast including sales forecast and associated variance for each of the age classification of the product. The module may be also operable to receive cost information associated with the product, the cost information including a wholesale cost, a retail sale price, a salvage price and a holding cost associated with the product. The module may be further operable to maximize the stochastic dynamic programming formulation that takes as input said inventory status, the stochastic demand forecast and the cost information, and determine order quantity and depletion quantity of the product per period based on the maximizing of the stochastic dynamic programming formulation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4 shows the dynamics of the freshness inventory system in one embodiment of the present disclosure.

DETAILED DESCRIPTION

Figure 1:
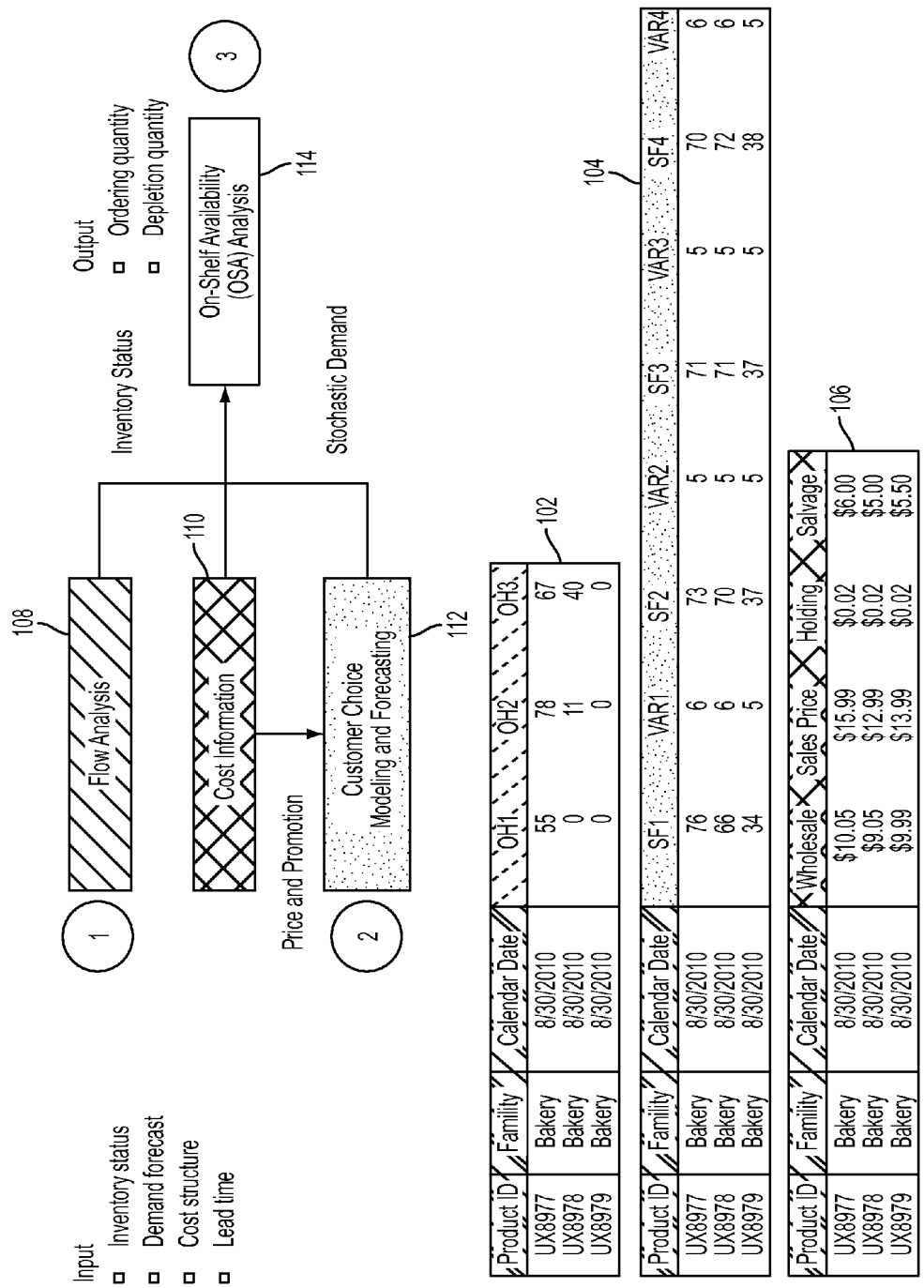
FIG. 1 is a flow diagram showing a data flow in one embodiment of the present disclosure.

Freshness inventory refers to a stocking system of products with a relatively short shelf life, for controlling and managing a measure of freshness. In one embodiment of the present disclosure, such inventory control mechanism may be formulated as a stochastic dynamic program. An optimal control may be presented as a variation of the non-stationary $(S_t, s_t)$ policy, which includes, for each period t, not only the usual order-up-to action but also a deplete-down-to mechanism. The latter may secure the salvage value from depleted units to offset the risk of their further degradation or obsolescence.

Direct Store Delivery (DSD) is a method of selling and distributing products in a variety of industries. Manufacturers use the DSD business model to distribute goods directly to the points of sales in the supply chain, such as retail stores, bypassing any retailer or wholesaler logistics. DSD means that a manufacturer delivers store by store, services the shelves or displays, merchandises the product, adjusts pricing, displays point of sale material, and then moves on to the next store. This delivery model is used in the consumer products industry for fresh products such as milk and bread where minimizing the number of days that products spend in the supply chain is a concern. DSD is a strategic growth area in the food industry, as the model delivers a broad range of business benefits to all parties of the value chain.

The present disclosure is applicable to inventory control in a DSD supply chain, where products have a relatively short shelf life and managing inventory freshness is a concern. Examples include products such as fresh bread, produce, meat and dairy products, etc. A retailer selling such products to customers will typically hold inventory of the same product but with a certain "age" distribution; for instance, bread or milk with different expiration dates. In the present disclosure, such inventory systems are referred to as freshness inventory. Interpreting product age or freshness differently, the mechanism of the present disclosure may readily extend to inventory systems of fashion products, seasonal goods, and consumer electronics.

Managing product inventory in one aspect of the present disclosure may use the knowledge of the age of products in the supply chain network to determine the ordering and depletion quantities. A method and system, in one aspect, maximize a given utility such as retailer profitability, for instance, using a utility function. The utility function may take price premiums into account that customers are willing to pay for fresher products.

In one embodiment, a methodology of the present disclosure may include formulating demand forecast for each product as a function of price and freshness. The formulation for demand forecast in one embodiment may also take an account of currently available product inventory, together with the freshness of products, for example, at a retail store. These two data elements (the available product inventory and the freshness of products) may be used to determine optimized restocking quantities and depletion quantities that maximize the retailer's total benefit.

The methodology of the present disclosure, in one aspect, may provide superior inventory recommendations that balance stock-out risk, product expiration risk, and freshness premium. The differentiated inventory management of the present disclosure based on product freshness may also provide competitive advantage to retailers that market and promote fresh products.

Managing freshness inventory of the present disclosure may include monitoring not only the stocking levels but also the age distributions of the products, and determining replenishment decisions and depletion decisions. The depletion decisions may involve monitoring depleting part of the on-hand, aged inventory units and replacing them by fresh units. The depletion decision secures associated salvage value for the depleted units to offset the risk of their further degradation or obsolescence. For instance, large bakeries that operate a DSD model deliver daily supplies of fresh bread to their retailers, and at the same time remove part of the aged bread stock that has been on shelf for several days and sell it to secondary channels such as bakery outlets or discount stores. Hence, for freshness inventory, one product typically breaks down to several sub-classes according to their ages (or other measures of freshness). And in addition to the replenishment decision, the depletion decision is considered.

In one embodiment of the present disclosure, a stochastic dynamic programming formulation is provided with a non-stationary demand and time-dependent cost parameters. The formulation (also referred to as a model), in one aspect, assumes zero lead time and fixed product lifetime. The formulation in one embodiment allows depletion, in addition to the ordering action. The formulation of the present disclosure in one embodiment, which adopts the non-stationary setting and the depletion mechanism, maintains the optimality of the $(S_t, s_t)$ policy.

With a stochastic dynamic programming formulation, we can write the optimal value-to-go function, in period t, in the following form:

$$V_t(x) = \max_{y \geq z, x \geq z \geq 0} G_t(y, z),$$

with x denoting the on-hand inventory at the beginning of period t, y and z, the order-up-to and deplete-down-to levels.

The function $G_t(y,z)$, as well as $V_t$, has the following properties: For every t=1, ..., T, (i) $G_t(y,z)$ is concave in z;
(ii) y*, the maximizer of $G_t(y,z)$, given z, is independent of x; and
(iii) $V_t(x)$ is increasing and concave in x.

Let $(S_t, s_t)=(y^*, z^*)$ be the solution to $$\max_{y \geq z \geq 0} G_t(y, z)$$

(i.e., not considering the on-hand inventory constraint, $x \geq z$). Then, the optimal inventory control, taking into account the on-hand inventory, is a variation of the non-stationary $(S_t, s_t)$ policy. Specifically, for every period t, if the on-hand inventory $x_t$ (at the beginning of the period) falls below $s_t$, this will trigger a replenishment order of size up to $S_t$ (just like the usual $(S_t, s_t)$ policy); if the on-hand inventory is above $s_t$, then there is the additional control of first depleting the on-hand inventory down to $s_t$, and then ordering up to $S_t$. Hence, the optimal deplete-down-to level is $s_t \wedge x_t$, and the optimal order-up-to quantity is $S_t - (S_t \wedge x_t)$.

The control parameters, $(S_t, s_t)$ in the model of the present disclosure in one embodiment are obtained via recursively solving a sequence of concave maximization problems: maximizing the $G_t$ function described above.

FIG. 1 is a flow diagram showing data flow in one embodiment of the present disclosure. A model or formulation of the present disclosure in one embodiment may take as inputs, inventory status, demand forecast, and cost structure. An example of inventory status is shown at 102. 102 shows products with on-hand inventory with three different ages, e.g., OH1, OH2, OH3, with OH1 being the most aged (1 period of remaining shelf-life), and OH3 the least aged (3 periods of remaining shelf-life) among the on-hand inventory. For instance, the product identified with product code "UX8977" includes 55 units of OH1, 78 units of OH2, and 67 units of OH3.

An example of demand forecast specification is shown at 104. For instance, the product identified with code "UX8977" has a sales forecast (SF1) of 76 units and a variance (VAR1) of 6 units for time period 1, a sales forecast of 73 and variance of 5 units for time period 2, a sales forecast of 71 and variance of 5 units for time period 3, and a sales forecast of 70 and variance of 6 units for time period 4.

An example of cost structure is shown at 106. For instance, the product identified with product code "UX8977" has a wholesale price of $10.05 (what the retailer pays to the wholesaler), a sales price of $15.99 (what the retailer sells to the consumer), a holding cost of $0.02 (cost to the retailer for keeping the product in stock for one period), and a salvage cost of $6.00 (the price by which the retailer sells to alternate channels such as thrift stores).

Using the above described input, the methodology of the present disclosure in one embodiment determines an ordering quantity and depletion quantity as output. The ordering quantity specifies the amount to order and the depletion quantity specifies the amount to deplete in each period t. Flow analysis 108 of incoming and outgoing goods produces inventory status. Customer choice modeling and forecasting 112 provide stochastic demand forecast, as shown at 104. The information with cost information 110 is used in the model or formulation of the present disclosure for on-shelf availability (OSA) analysis 114 and produces the output ($S_t$, $s_t$).

Figure 2:
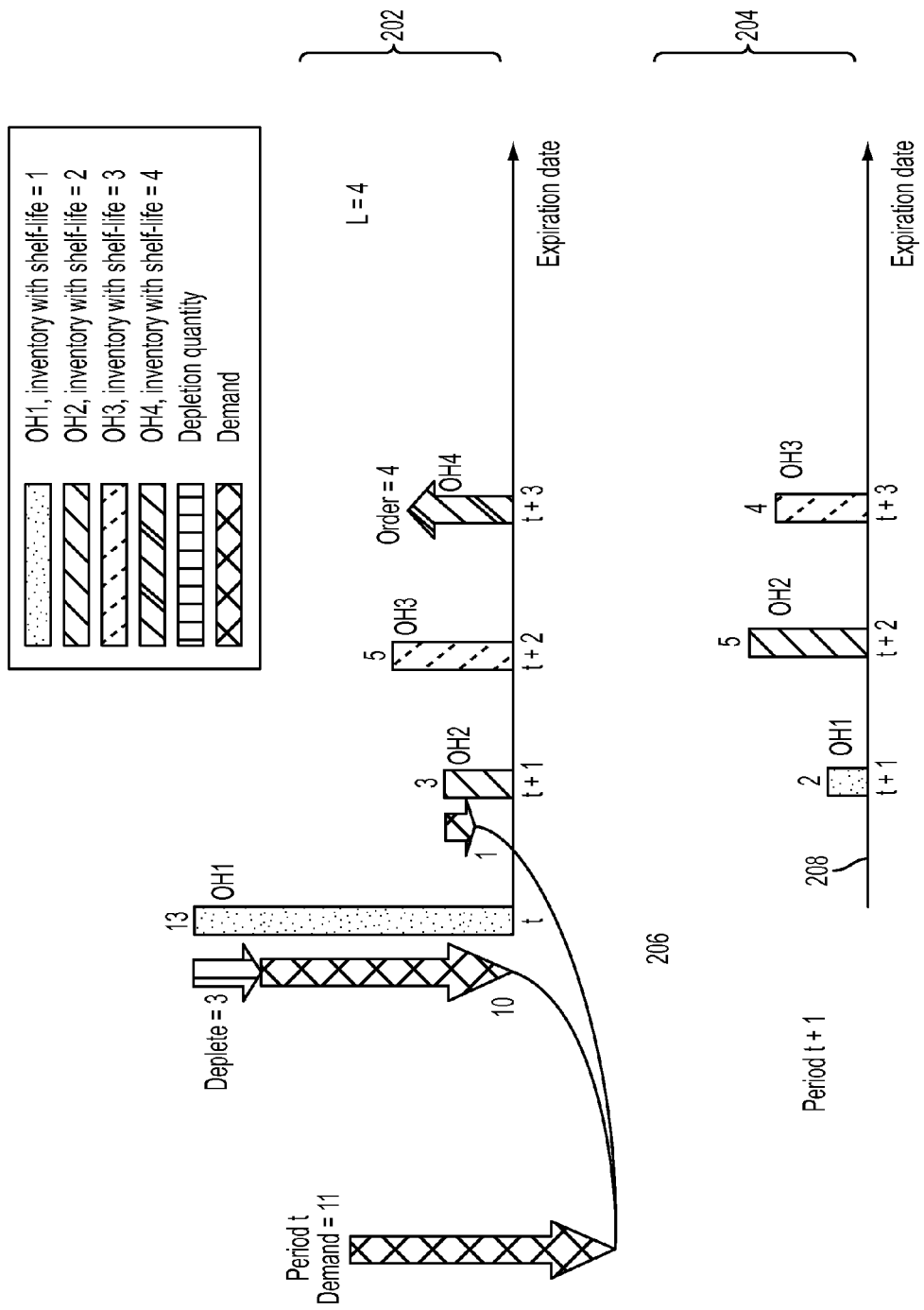
FIG. 2 is a diagram illustrating age distribution of inventory in graph format in one embodiment of the present disclosure.

FIGS. 2 and 4 show the workings of optimized levels of inventory as a result of applying and optimizing a formulation of the present disclosure in one embodiment. Optimization of the formulation produces deplete and order quantities that maximize total expected profit.

FIG. 2 is a diagram illustrating age distribution of freshness inventory in graphical form in one embodiment of the present disclosure. Products of freshness inventory have limited shelf-life. In one embodiment of the present disclosure, on-hand (OH) inventory is classified by age (e.g., $OH^1$, $OH^2, \ldots, OH^L$). The superscripts, 1 . . . L, refer to the remaining shelf-life in periods. In FIG. 2, at the beginning of period t, we observe there are 13 units having 1 period of shelf-life left (i.e., to expire at the end of period t), 3 units having 2 periods of shelf-life left (to expire at the end of period t+1), and 5 units having 3 periods of shelf-life left (to expire at the end of period t+2). A decision is then made to deplete 3 units of the most aged product, and order 4 units of the fresh product (to expire at the end of period t+3). Next, a demand equal to 11 units is realized in period t. Consequently, at the beginning of period t+1, we observe an updated age distribution of on-hand inventory: 2 units have 1 period of remaining shelf-life, 5 units have 2 periods of remaining shelf-life and 4 units have 3 periods of remaining shelf-life.

The graphs 202 and 204 show the transition of the on-hand inventory, along with its age distribution, from period t to period t+1. For instance, the amount of $OH^1$ (206 and 208) decreases from 13 units in period t to 0 in period t+1: 3 units were depleted outright at the beginning of period t, and 10 units are used to supply the demand; the other unit of demand (a total of 11) was supplied from the 3 units of OH2, of which the remaining 2 units are carried over to period t+1 and relabeled OH1 as their shelf-life has decreased by one period.

FIG. 4 further explains the dynamics of the freshness inventory system. 402 shows the age distribution of product "UX8977" at the beginning of period t. 404 shows the impact of depletion and ordering decisions on the age distribution, as calculated by the stochastic dynamic programming model of the presents disclosure in one embodiment. 406 shows the age distribution at the beginning of period t+1, after demand of 11 units is realized.

Figure 3:
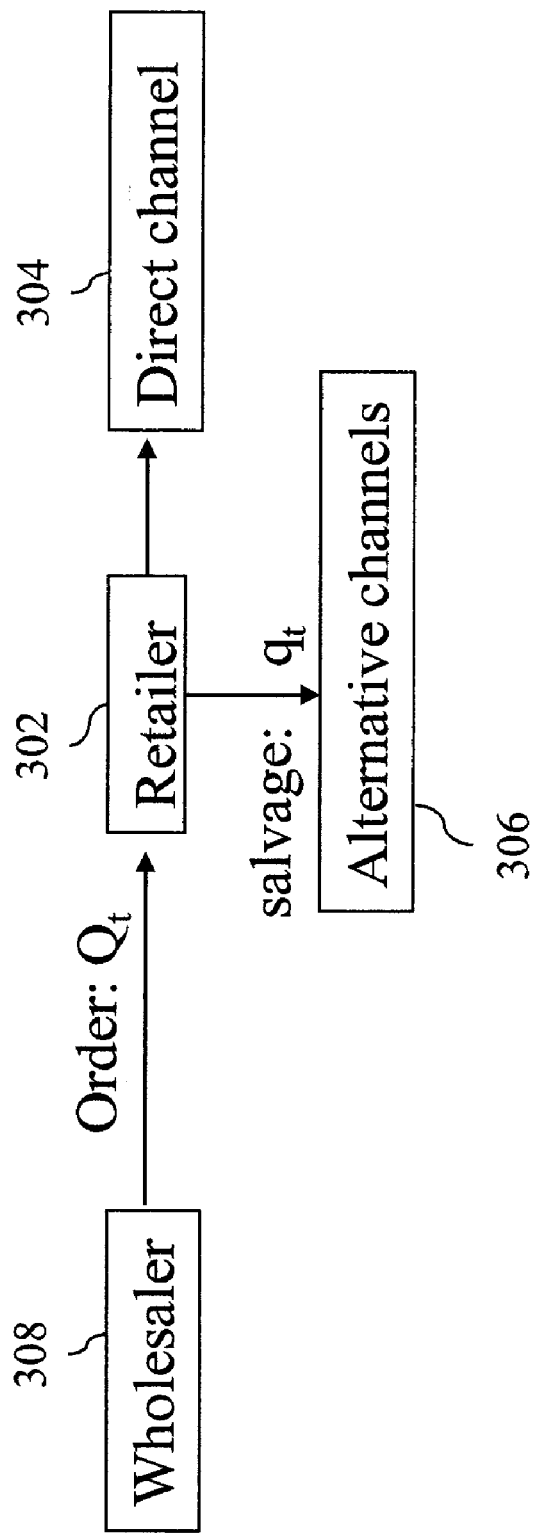
FIG. 3 illustrates a dynamic program for managing inventory freshness in one embodiment of present disclosure.

FIG. 3 illustrates a dynamic program for managing freshness inventory in one embodiment of present disclosure. A model setting in one embodiment may include periodic demand by a retailer 302, and multiple sales channels, e.g., direct channel 304 and one or more alternative channels 306. For instance, retailer's periodic demands or orders $Q_t$ are fulfilled by a supplying entity such as a wholesaler 308. The retailer 302 sells the items to consumers via a direct channel 304. Aged items in inventory $q_t$ may be sold to alternative channels 306, such as discount stores. An objective of the model in one embodiment is to maximize the expected discounted profit over T periods.

In one embodiment, on-hand inventory with age distribution ($OH^1, \ldots, OH^L$) is observed. Aged inventory may be salvaged or transferred to alternative channels such as discount stores or others, at the unit price ($c^1_t, \ldots, c^{L-1}_t$). The retailer 302 orders fresh product from a wholesaler 308 or the like at the unit cost $c^L_t$. The retailer 302 sells products to direct channel (e.g., consumer) at the unit price $p_t$. Utilizing the model of the present disclosure in one embodiment may reduce unsatisfied demand in the current period and may also reduce or eliminate expired inventory at the end of the period. Aged inventory may be carried over to the next period, and incur a unit holding cost $h_t$.

The following illustrates an example where shelf-life of a product may be 2. The superscripts 1 and 2 are used to index, respectively, products with 1 period of remaining shelf-life and those with 2 periods of remaining shelf-life, the latter being fresh products, and the former representing aged products. Observed on-hand inventory for the aged product is represented by x. Order-up-to level for both the fresh and aged products is represented by y. Order-up-to level is the maximum inventory. Deplete-down-to level for the aged product is represented by z. Deplete-down-to level is the minimum inventory level. If inventory reaches deplete-down-to level, order should be placed to replenish inventory to the order-up-to level. The sales price of a fresh product is greater than equal to ($\geq$) whole sale price of the fresh product, which is greater than equal to ($\geq$) salvage value of the aged product, i.e., $p_t \geq c^2_t \leq c^1_t$. The following then represents the dynamic programming model for this example:

$$U_t(x) = \max_{y \geq z, x \geq z \geq 0} E[p_t(y \wedge d_t) + c^1_t(x-z) - c^2_t(y-z) -$$
$$h_t(y-d_t)^+ - b_t(d_t-y)^+ + \gamma U_{t+1}([y-(z \vee d_t)]^+)]$$
$$U_{t+1}(x) = c^1_t x$$
$$x_{t+1} = [y-(z \vee d_t)]^+ = (y-d_t)^+ - (z-d_t)^+$$

In the above formulation, $U_t(x)$ represents the total expected profit from period t to T given that the on-hand inventory of aged products at the beginning of period t is x units; $h_t$ represents unit holding cost in period t; $b_t$ represents the unit penalty for lost-sales in period t; $d_t$ represents stochastic demand in period t; γ is a time discount factor.

$U_t(x)$ is expressed as an expected value. The first term denotes revenue from sales, expressed as the minimum of the available inventory y and demand $d_t$. The second term denotes the salvage value derived from depleting (x−z) units of aged product. The third term is the procurement cost of acquiring (y−z) fresh products. The fourth term is the holding cost incurred by left over inventory $(y-d_t)^+$, where + denotes the non-negative portion. The fifth term is the penalty cost incurred by lost sales $(d_t-y)^+$. The last term denotes the total discounted expected profit from the subsequent time period t+1 to T.

$U_{T+1}(x)$ is the salvage value generated from on-hand inventory x at the end of the planning horizon.

$x_{t+1}$ is the on-hand inventory at the beginning of period t+1, derived as the difference of the order-up-to level y and the maximum of the aged inventory z and demand $d_t$.

The above formulation can be rewritten as:

$$U_t(x) = \max_{y \geq z, x \geq z \geq 0} G_t(y, z),$$

where $$G_t(y,z) = -b_t E(d_t) + (p_t + b_t - c_t^2)y - (p_t + h_t + b_t - \gamma c_{t+1}^1)E(y-d_t)^+ + (c_t^2 - c_t^1)z - \gamma c_{t+1}^1 E(z-d_t)^+ + \gamma E U_{t+1}((y-d_t)^+ - (z-d_t)^+).$$

$$U_{t+1}(x) = c_{T+1}^1 x$$

$$x_{t+1} = [y - (z \vee d_t)]^+ = (y-d_t)^+ - (z-d_t)^+$$

For every t=1, . . . , T, (i) $U_t(x)$ is increasing and concave in x, and (ii) y*, the maximizer of $G_t(y, z)$ for a given z, is independent of x, in one embodiment of the present disclosure.

The above dynamic programming problem may be solved using backward induction. Specifically, starting from t=T, for each t, we obtain the optimal (y*,z*) that solves max $G_t(y,z)$. Then, the optimal $(S^*_t, s^*_t)$ policy is specified as follows: $(S_t^*, s_t^*) = (y^*_t, z^*_t \wedge x)$.

The presence of a secondary channel improves profitability (for instance, when the salvage value is high), and also encourages the retailer to sell fresher. Under the strategy, retailers may sell fresher products, for instance, when the demand randomness increases and/or when the consumer surplus of freshness increases.

The methodology of the present disclosure in one embodiment accounts for freshness premium and considers price sensitivity as well as freshness sensitivity in a demand model. Multiple channels are considered for sales system, and both ordering and depletion may be jointly considered.

Figure 5:
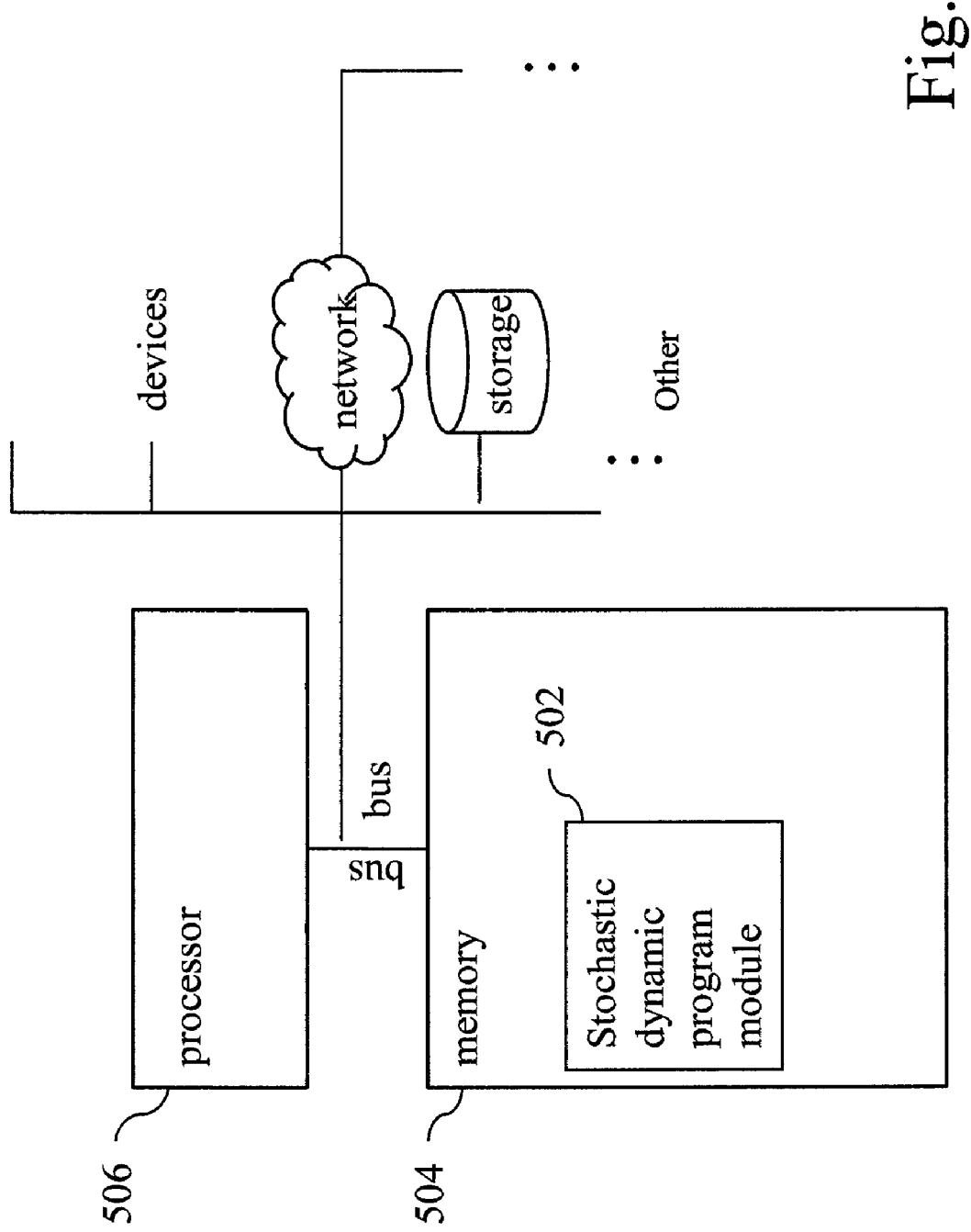
FIG. 5 illustrates processing components of a computer system that may implement the methodology of the present disclosure in one embodiment.

FIG. 5 is a diagram illustrating computer components that may run or implement the methodology of the present disclosure in one embodiment. A stochastic dynamic program module 502 may be stored in memory 504 and may include a dynamic programming formulation that models freshness inventory control mechanism as described above. The module 502 may also include programming logic for receiving inputs such as inventory status associated with a product having freshness shelf-life, stochastic demand forecast associated with the product, and cost information associated with the product, and optimizing the formulation using the inputs. The inventory status may include inventory of the product classified into age classification. The stochastic demand forecast may include sales forecast and associated variance for each of the age classification of the product. The cost information may include a wholesale cost, a retail sale price, a salvage price and a holding cost associated with the product. Based on the maximization of the dynamic program formulation, ordering and depletion quantities may be determined. The stochastic dynamic program formulation includes control parameters of deplete-down-to level and order-up-to-level associated with the inventory. Such quantities may be determined per period over multiple time period duration.

Figure 6:
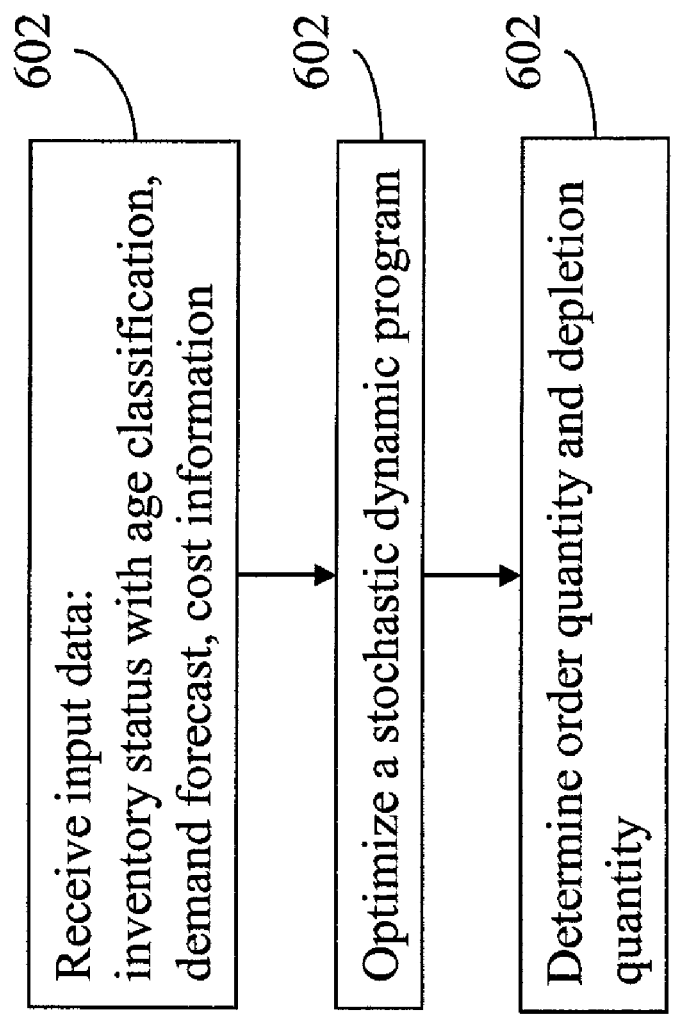
FIG. 6 is a flow diagram illustrating a method of the present disclosure in one embodiment.

FIG. 6 is a flow diagram illustrating a method of the present disclosure in one embodiment. At 602, a computer implemented program module may receive inventory status data associated with a product having freshness shelf-life, stochastic demand forecast data associated with the product, and cost information associated with the product. Such information may be received via a user interface that allows a user to enter data using an input device. Such information may be also read (automatically by the computer module, for example) from one or more data files stored in memory or data storage. Examples of such files may include, but are not limited to, text files, spreadsheet files, XML files, database files or tables, and others.

At 604, the computer implemented program module using the received data may run the stochastic dynamic programming formulation, maximizing the total expected profit of a retailer in a given period. At 606, the computer implemented program module may determine the order quantity and depletion quantity of the product per period based on said maximizing of the stochastic dynamic programming formulation. In one aspect, the steps may be repeated for a plurality of periods. The control parameters of the stochastic dynamic programming formulation are deplete-down-to level and order-up-to level of the inventory per period.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for managing inventory freshness, comprising:
receiving, by at least one processor, inventory status associated with a product having freshness shelf-life, the inventory status including inventory of the product classified into age classification;
receiving, by said at least one processor, stochastic demand forecast associated with the product, the stochastic demand forecast including sales forecast and associated variance for each of the age classification of the product;
receiving, by said at least one processor, cost information associated with the product, the cost information including a wholesale cost, a retail sale price, a salvage price and a holding cost associated with the product;
maximizing, by said at least one processor, a stochastic dynamic programming formulation that takes as input the inventory status, the stochastic demand forecast and the cost information; and
determining, by said at least one processor, order quantity and depletion quantity of the product per period based on said maximizing of the stochastic dynamic programming formulation,
wherein the dynamic programming formulation comprises:

$$U_t(x) = \max_{y \geq z, x \geq z \geq 0} G_t(y, z),$$

wherein $$G_t(y,z) = -b_t E(d_t) + (p_t + b_t - c_t^2)y - (p_t + h_t + b_t - \gamma c_{t+1}^1)E(y-d_t)^+ + (c_t^2 - c_t^1)z - \gamma c_{t+1}^1 E(z-d_t)^+ + \gamma E U_{t+1}((y-d_t)^+ - (z-d_t)^+),$$

$$U_{T+1}(x) = c_{T+1}^1 x,$$

wherein $U_t(x)$ represents total expected profit from period t to T given that on-hand inventory of aged products at beginning of period t is x units, y represents inventory order-up-to level, z represents inventory deplete-down-to level, $p_t$ represents a retail sales price at period t, $c_t^1$ represents a salvage value of an aged product at period t, $c_t^2$ represents a whole sale price of a fresh product at period t, $c_{t+1}^1$ represents a salvage value of an aged product at period t+1, $h_t$ represents unit holding cost in period t, $b_t$ represents the unit penalty for lost-sales in period t, $d_t$ represents stochastic demand in period t, γ is a time discount factor.

2. The method of claim 1, wherein the steps are repeated for a plurality of periods.

3. The method of claim 1, wherein the stochastic dynamic formulation includes control parameters of deplete-down-to level and order-up-to-level associated with the inventory.

4. The method of claim 3, wherein the control parameters are obtained by recursively solving a sequence of concave maximization of the stochastic dynamic formulation.

5. The method of claim 1, wherein the product includes one or more of bread, produce, meat, dairy products, fashion products, seasonal goods, or consumer electronics or combinations thereof.

6. The method of claim 1, wherein the age classification corresponds to a time period, and the steps of the method are performed for a sequence of time periods.

7. The method of claim 1, wherein the step of determining order quantity and depletion quantity of the product further includes determining one or more inventory strategies for multiple sales channels.

8. A non-transitory computer readable storage medium storing a program of instructions executable by a processor to perform a method of managing inventory freshness, comprising:
- receiving inventory status associated with a product having freshness shelf-life, the inventory status including inventory of the product classified into age classification;
- receiving stochastic demand forecast associated with the product, the stochastic demand forecast including sales forecast and associated variance for each of the age classification of the product;
- receiving cost information associated with the product, the cost information including a wholesale cost, a retail sale price, a salvage price and a holding cost associated with the product;
- maximizing, by a processor, a stochastic dynamic programming formulation that takes as input the inventory status, the stochastic demand forecast and the cost information; and
- determining order quantity and depletion quantity of the product per period based on said maximizing of the stochastic dynamic programming formulation, wherein the dynamic programming formulation comprises:

$$U_t(x) = \max_{y \geq z, x \geq z \geq 0} G_t(y, z),$$

wherein $$G_t(y,z) = -b_t E(d_t) + (p_t + b_t - \gamma c_t^2)y - (p_t + h_t + b_t - \gamma c^1_{t+1})E(y-d_t)^+ + (c_t^2 - c_t^1)z - \gamma c_{t+1}^1 E(z-d_t)^+ + \gamma E U_{t+1}((y-d_t)^+ - (z-d_t)^+),$$

$$U_{t+1}(x) = c^1_{T+1} x,$$

wherein $U_t(x)$ represents total expected profit from period t to T given that on-hand inventory of aged products at beginning of period t is x units, y represents inventory order-up-to level, z represents inventor deplete-down-to level, $p_t$ resents a retail sales price, $c_t^1$ represents a salvage value of an aged product at period t, $c_t^2$ represents a whole sale price of a fresh product at period t, $c^1_{t+1}$, represents a salvage value of an aged product at period t+1, $h_t$ represents unit holding cost in period t, $\gamma$ represents the unit penalty for lost-sales in period t, $d_t$ represents stochastic demand in period t, $\gamma$ is a time discount factor.

9. The computer readable storage medium of claim 8, wherein the age classification corresponds to a time period, and the steps of the method are performed for a sequence of time periods.

10. The computer readable storage medium of claim 8, wherein the stochastic dynamic formulation includes control parameters of deplete-down-to level and order-up-to-level associated with the inventory.

11. The computer readable storage medium of claim 10, wherein the control parameters are obtained by recursively solving a sequence of concave maximization of the stochastic dynamic formulation.

12. The computer readable storage medium of claim 8, wherein the product includes one or more of bread, produce, meat, dairy products, fashion products, seasonal goods, or consumer electronics or combinations thereof.

13. The computer readable storage medium of claim 8, wherein the step of determining order quantity and depletion quantity of the product further includes determining one or more inventory strategies for multiple sales channels.

14. A system for managing inventory freshness, comprising:
- a processor;
- a stochastic dynamic programming formulation stored in memory; and
- a module operable to execute on the processor, the module further operable to receive inventory status associated with a product having freshness shelf-life, the inventory status including inventory of the product classified into age classification,
- the module further operable to receive stochastic demand forecast associated with the product, the stochastic demand forecast including sales forecast and associated variance for each of the age classification of the product,
- the module further operable to receive cost information associated with the product, the cost information including a wholesale cost, a retail sale price, a salvage price and a holding cost associated with the product,
- the module further operable to maximize the stochastic dynamic programming formulation that takes as input the inventory status, the stochastic demand forecast and the cost information, the module further operable to determine order quantity and depletion quantity of the product per period based on said maximizing of the stochastic dynamic programming formulation,
- wherein the dynamic programming formulation comprises:

$$U_t(x) = \max_{y \geq z, x \geq z \geq 0} G_t(y, z),$$

wherein $$G_t(y,z) = -b_t E(d_t) + (p_t + b_t - c_t^2)y - (p_t + h_t + b_t - \gamma c^1_{t+1})E(y-d_t)^+ + (c_t^2 - c_t^1)z - \gamma c^1_{t+1} E(z-d_t)^+ + \gamma E U_{t+1}((y-d_t)^+ - (z-d_t)^+),$$

$$U_{t+1}(x) = c^1_{T+1} x,$$

wherein $U_t(x)$ represents total expected profit from period t to T given that on-hand inventory of aged products at beginning of period t is x units, y represents inventory order-up-to level, z represents inventor deplete-down-to level, $p_t$ represents a retail sales price, $c_t^1$ represents a salvage value of an aged product at period t, $c_t^2$ represents a whole sale price of a fresh product at period t, $c^1_{t+1}$, represents a salvage value of an aged product at period t+1, $h_t$ represents unit holding cost in period t, $b_t$ represents the unit penalty for lost-sales in period t, $d_t$ represents stochastic demand in period t, $\gamma$ is a time discount factor.

15. The system of claim 14, wherein the steps are repeated for a plurality of periods.

16. The system of claim 14, wherein the stochastic dynamic formulation includes control parameters of deplete-down-to level and order-up-to-level associated with the inventory.

17. The system of claim 16, wherein the control parameters are obtained by recursively solving a sequence of concave maximization of the stochastic dynamic formulation.

18. The system of claim 14, wherein the product includes one or more of bread, produce, meat, dairy products, fashion products, seasonal goods, or consumer electronics or combinations thereof.

19. The system of claim 14, wherein the age classification corresponds to a time period, and the steps of the method are performed for a sequence of time periods.

20. The system of claim 14, wherein the step of determining order quantity and depletion quantity of the product further includes determining one or more inventory strategies for multiple sales channels.

* * * * *